(12) United States Patent
Poplawski

(10) Patent No.: US 7,194,402 B2
(45) Date of Patent: Mar. 20, 2007

(54) METHOD AND SYSTEM FOR CONVERTING FILES TO A SPECIFIED MARKUP LANGUAGE

(75) Inventor: Laura J. Poplawski, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 10/042,400

(22) Filed: Jan. 9, 2002

(65) Prior Publication Data

US 2003/0130845 A1    Jul. 10, 2003

(51) Int. Cl.
*G06F 9/45* (2006.01)
*G06F 17/27* (2006.01)

(52) U.S. Cl. .................. 704/3; 715/523; 717/136; 717/144

(58) Field of Classification Search ............. 704/1, 704/2, 3, 7; 715/513, 523; 717/136, 144
See application file for complete search history.

(56) References Cited

U.S. PATENT DOCUMENTS

| | | | |
|---|---|---|---|
| 5,490,242 A * | 2/1996 | Tamura ................. 715/513 |
| 5,970,490 A * | 10/1999 | Morgenstern .......... 707/10 |
| 6,012,098 A | 1/2000 | Bayeh et al. |
| 6,055,494 A | 4/2000 | Friedman |
| 6,083,276 A | 7/2000 | Davidson et al. |
| 6,125,391 A | 9/2000 | Meltzer et al. |
| 6,154,738 A | 11/2000 | Call |
| 6,170,081 B1 | 1/2001 | Fontana et al. |
| 6,182,029 B1 | 1/2001 | Friedman |
| 6,292,932 B1 * | 9/2001 | Baisley et al. ........... 717/114 |
| 6,487,566 B1 * | 11/2002 | Sundaresan ............. 715/513 |
| 6,665,863 B1 * | 12/2003 | Lord et al. .............. 717/144 |
| 6,678,867 B2 * | 1/2004 | Fong et al. .............. 715/523 |
| 6,687,873 B1 * | 2/2004 | Ballantyne et al. ...... 715/500 |
| 6,725,424 B1 * | 4/2004 | Schwerdtfeger et al. .. 715/513 |
| 6,772,395 B1 * | 8/2004 | Hyman et al. ........... 715/513 |
| 6,772,413 B2 * | 8/2004 | Kuznetsov .............. 717/136 |
| 6,785,685 B2 * | 8/2004 | Soetarman et al. ...... 707/101 |
| 6,820,135 B1 * | 11/2004 | Dingman et al. ........ 709/246 |

(Continued)

OTHER PUBLICATIONS

Wikipedia, definition of "flat file database", Jun. 20, 2005, 6 pages.*
Wikipedia, "Document Type Definition," 5 pages.*

*Primary Examiner*—Martin Lerner
(74) *Attorney, Agent, or Firm*—Scullly, Scott, Murphy & Presser, P.C.; William E. Schiesser

(57) ABSTRACT

A method and system for converting a delimited flat file to a markup language specified by a document type definition file. The method comprises the steps of providing a delimited flat file having columns with headings, and providing a map file conforming to said document type definition file and having tags and attributes including references matching said headings. A tree structure is formed from the map file, with each tag representing one or more nodes of the tree. The tree structure is traversed, node-by-node, and for each node, the attributes are entered into said markup language file. When the attributes include one of said references, text is retrieved from one of the columns with one of the matching headings of the flat file, and that text is entered into the markup language file.

15 Claims, 3 Drawing Sheets

U.S. PATENT DOCUMENTS

| | | |
|---|---|---|
| 6,928,642 B2 * | 8/2005 | Seelemann .................. 717/160 |
| 6,996,776 B1 * | 2/2006 | Makely et al. ............... 715/523 |
| 7,055,094 B2 * | 5/2006 | Imielinski et al. ........... 715/517 |
| 7,117,433 B1 * | 10/2006 | Glaser et al. ................ 715/513 |
| 2002/0194227 A1 * | 12/2002 | Day et al. ................... 707/523 |

* cited by examiner

METHOD OF CONVERTING A DELIMITED FLAT
FILE TO A MARKUP LANGUAGE SPECIFIED BY
A DOCUMENT TYPE DEFINITION FILE

*FIG. 3*

PROVIDING A DELIMITED FLAT FILE HAVING COLUMNS WITH HEADINGS

PROVIDING A MAP FILE CONFORMING TO SAID DOCUMENT TYPE DEFINITION FILE AND HAVING TAGS AND ATTRIBUTES INCLUDING REFERENCES MATCHING SAID HEADINGS

FORMING A TREE STRUCTURE FROM SAID MAP FILE WHEREIN EACH TAG REPRESENTS ONE OR MORE NODES OF SAID TREE

TRAVERSING NODE-BY-NODE SAID TREE STRUCTURE AND FOR EACH SAID NODE ENTERING SAID ATTRIBUTES INTO SAID MARKUP LANGUAGE FILE

WHEN SAID ATTRIBUTES INCLUDE ONE OF SAID REFERENCES, RETRIEVING TEXT FROM ONE OF SAID COLUMNS WITH ONE OF SAID MATCHING HEADINGS OF SAID FLAT FILE AND ENTERING SAID TEXT INTO SAID MARKUP LANGUAGE FILE

*FIG. 4*

```
<!ELEMENT map (doctype?,stylesheet?,element_node+)>
<!ELEMENT stylesheet (#PCDATA)>
<!ELEMENT doctype (#PCDATA)>
<!ELEMENT element_node (attribute_node*,(text_node|element_node)*)>
<!ATTLIST element_node  name       CDATA          #REQUIRED
                        occurence (zero_or_more|one_or_more|optional|one) "one"
                        isEntireRow (yes|no)      "no">
<!ELEMENT text_node (#PCDATA)>
<!ATTLIST text_node     column     CDATA          #REQUIRED>
<!ELEMENT attribute_node (text_node)>
<!ATTLIST attribute_node name      CDATA          #REQUIRED>
```

METHOD AND SYSTEM FOR CONVERTING FILES TO A SPECIFIED MARKUP LANGUAGE

BACKGROUND OF THE INVENTION

1. Field of the Invention

This invention generally relates to information processing in a computer system, and more specifically, to converting data files to a specified format. Even more specifically, the invention relates to methods and systems particularly well suited for converting data to an XML format.

2. Prior Art

Extensible Markup Language (XML) is a format for storing computer data and is becoming increasingly popular, particularly for data that are accessed or transmitted over the Internet. With XML as an emerging technology, there is a need to convert legacy data to an XML format. While data can be converted by hand, on a case-by-case basis, there is currently no widely applicable, generalized and automated technique to do this conversion.

SUMMARY OF THE INVENTION

An object of this invention is to provide a simple, generalized procedure for converting data to a specified markup language.

Another object of the present invention is to provide a parser that can be used on its own or as part of a larger system to convert large amounts of data quickly to an XML format.

A further object of the invention is to provide a parser that can be used, with little or no modification, to convert any delimited file input into any XML formatted output.

These and other objects are attained with a method and system for converting a delimited flat file to a markup language specified by a document type definition file. The method comprises the steps of providing a delimited flat file having columns with headings, and providing a map file conforming to said document type definition file and having tags and attributes including references matching said headings. A tree structure is formed from the map file, with each tag representing one or more nodes of the tree. The tree structure is traversed, node-by-node, and for each node, the attributes are entered into said markup language file. When the attributes include one of said references, text is retrieved from one of the columns with one of the matching headings of the flat file, and that text is entered into the markup language file.

The preferred embodiment of the invention is very well suited to convert legacy data to an XML format. If this legacy data is in the form of a delimited flat-file, this parser will automatically perform the conversion. Similarly, if data comes from an EDI transaction, an existing converter could be used to transform the EDI document to a flat file, and this new parser could then transform the data to an XML document. XML is quickly becoming a common format for storing and using data which comes in through EDI. The user needs only to create a map file (the map file is an XML file conforming to a specific DTD), which tells the parser which pieces of information should be included in which elements/attributes of the resulting XML document. This parser could be incorporated into a larger system which uses the XML document. Since the map file is itself an XML document conforming to a specific DTD, a user interface could easily be created for writing and updating map files. It should be noted that the parser output is not limited to a file. It could also be a string (instead of a file), which could be transferred over the network, transformed to HTML and displayed on a browser, stored in a database, added to a message queue, etc.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 3 outlines a method embodying the invention.

FIG. 4 shows the contents of a map file that may be used in this invention.

DETAILED DESCRIPTION OF THE PREFERRED EMBODIMENTS

Figure 1:
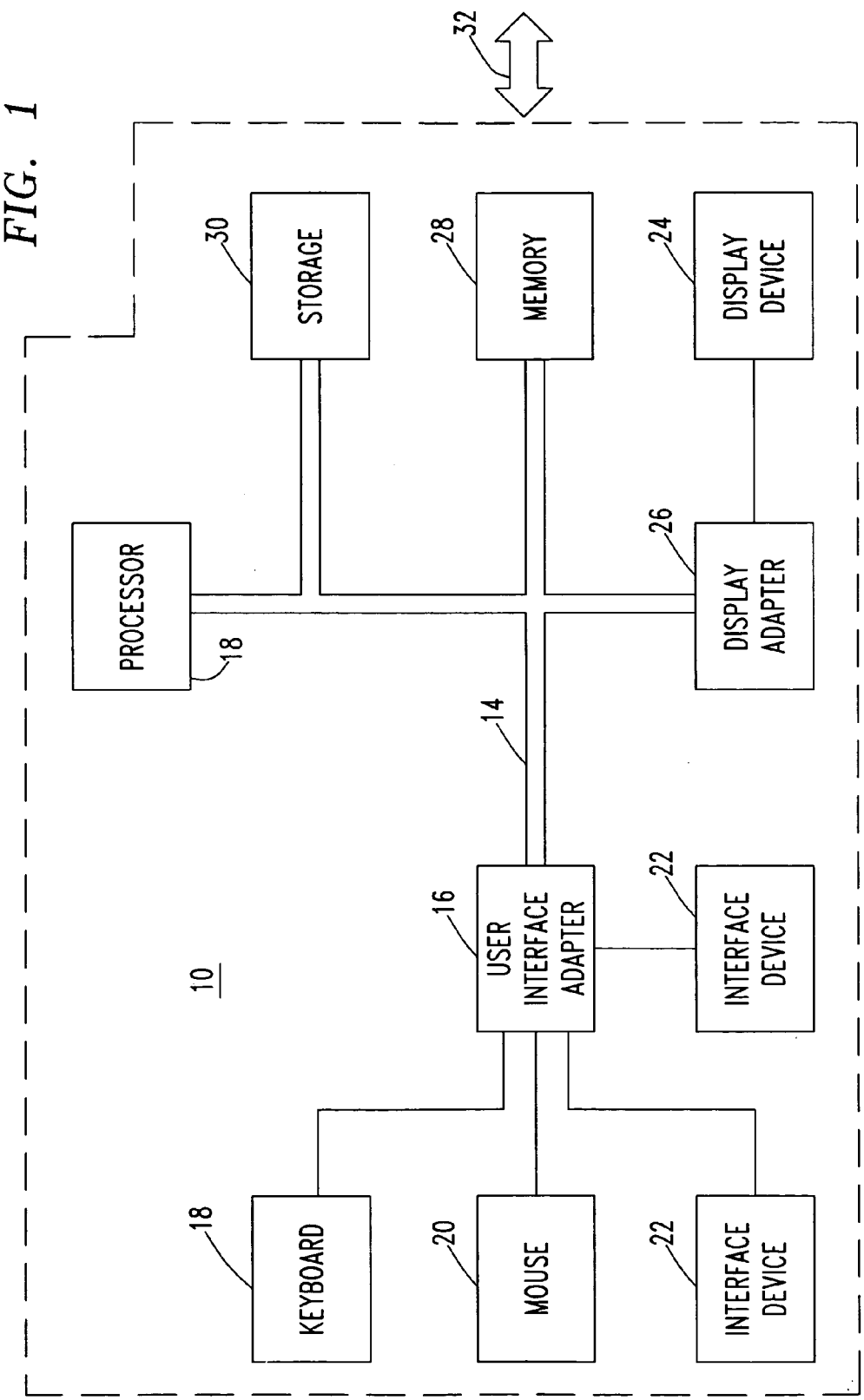
FIG. 1 is a block diagram of a computer workstation in which the present invention may be practiced.

FIG. 1 illustrates a representative workstation hardware environment in which the present invention may be practiced. This environment comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26.

The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
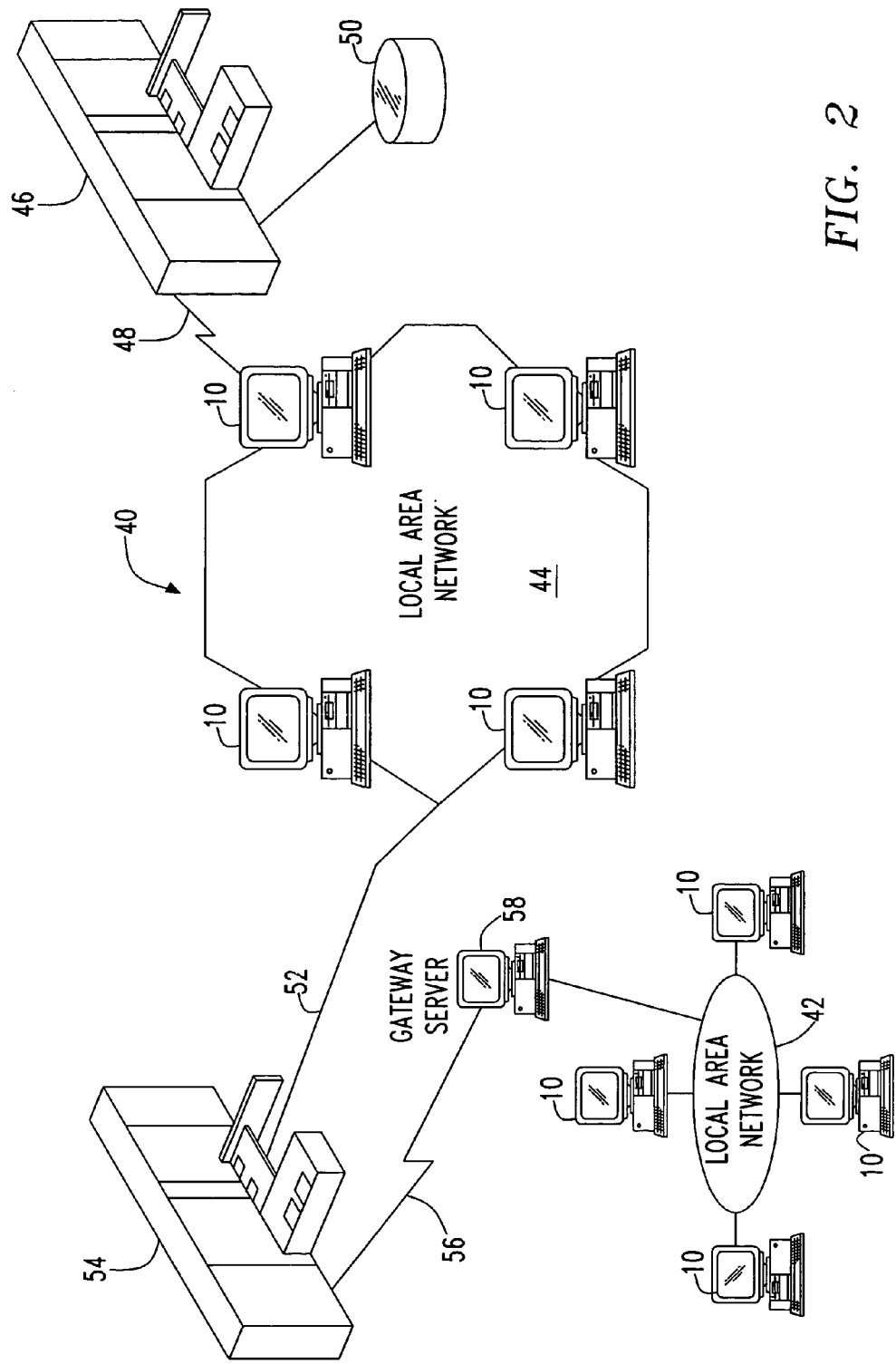
FIG. 2 illustrates a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370", "Enterprise Systems Architecture/390", "Enterprise Systems Architecture/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The data stream resulting from use of the present invention may be stored on any of the various media types used by the long-term storage 30, or may be sent from the workstation 10 to another computer or workstation of the network illustrated in FIG. 2 over the communications channel 32, for storage by that other computer or workstation.

As mentioned above, XML is becoming an increasingly popular format for data that is transmitted between and accessed from computer networks, and FIG. 3 shows a conversion method, embodying this invention, that may be used to convert data into an XML format. This method is for converting a delimited flat file to a markup language specified by a document type definition file; and the method comprises the steps of providing a delimited flat file having columns with headings, and providing a map file conforming to the document type definition file and having tags and attributes including references matching the headings. A tree structure is formed from the map file, with each tag representing one or more nodes of the tree; and the tree structure is traversed, node-by-node, and for each node, the attributes are entered into said markup language file. When the attributes include one of said references, text is retrieved from one of the columns with one of the matching headings of the flat file, and that text is entered into the markup language file.

Also as indicated previously, the preferred embodiment of the invention is well suited to convert legacy data to an XML format. If this legacy data are in the form of a delimited flat-file, this parser will automatically perform the conversion. Similarly, if data comes from an EDI transaction, an existing converter could be used to transform the EDI document to a flat file, and this new parser could then transform the data to an XML document. XML is quickly becoming a common format for storing and using data which comes in through EDI. The user needs only to create a map file (the map file is an XML file conforming to a specific DTD), which tells the parser which pieces of information should be included in which elements/attributes of the resulting XML document. This parser could be incorporated into a larger system which uses the XML document. Since the map file is itself an XML document conforming to a specific DTD, a user interface could easily be created for writing and updating map files.

The parser starts with the user-created, user-specified map file. This is an XML document conforming to a specific Document Type Definition (DTD). The parser reads this file along with a user-specified tab-delimited file. (The code could be easily modified to handle other delimiters.) The delimited file is parsed, and a new XML document is created (assigned a user-specified name). The new XML document contains the information from the delimited file in an XML format specified by the map file. This parser could be used on its own, to convert large amounts of data quickly to an XML format. Alternatively, it could be used as part of a larger system. For instance, if the user needs to convert EDI data input into an XML document, this parser could be used in conjunction with an existing EDI converter (which converts the EDI data to a delimited file).

The parser includes two major pieces, the parser code itself and map.dtd. map.dtd is the specification for the map file, and this map file tells the parser how to format the data in the resulting XML document. The contents of a map.dtd file are shown, for an example, in FIG. 4.

The user must create an XML document which conforms to this DTD. The map file gives the following information:

(1) the element and attribute structure for the resulting XML document.

(2) the name of the column in the flat file from which to get each piece of PCDATA and CDATA (or the exact text to be printed if this is to be default text—i.e., the same in each element) in the resulting XML document.

The file specified by the user must have headings on the columns which match the references in the map file.

The parser reads the map file into a DOM tree, for example, using IBM XML-4J version 3.0. A DOM tree, it may be noted, is an established recommendation by the w3c. From the information included in the map, the parser will know where to print which element and where to get the information to put into the elements. Therefore no matter what DTD and flat file the user specified, the parser will be able to create an XML document. A recursive method is used to move through the DOM tree of the map file, printing element_nodes and attribute_nodes whenever they exist, pulling the text from the specified columns in the delimited file. The parser knows how to deal with these by way of the user's map file—the user will specify in the map which elements are to be optional, which are to have multiple occurrence, which are nested, etc. map.dtd specifies how to write a map file that describes any of these scenarios.

The parser can deal with optional elements, multiple occurrence elements, nested elements, PCDATA anywhere within an element (including after a child element), attributes, doctypes, processing instructions.

The resulting document will be either printed to a file or stored as a string, depending on the user specification. It should be noted that the parser output is not limited to a file. It could also be a string (instead of a file), which could be transferred over the network, transformed to HTML and displayed on a browser, stored in a database, added to a message queue, etc.

The parser of this invention is very general. It can be used (with little or no modification) for any delimited file input and any XML formatted output. The formats of the input and output files need only to be specified in a relatively simple map file conforming to the map DTD included with the parser.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of converting text in a delimited flat legacy file to text in a markup language specified by a document type definition file, said method comprising the steps of:

providing a delimited flat legacy file having a plurality of columns with text, each of said columns having a column heading;

providing a map file conforming to said document type definition file and having tags and attributes including references matching said headings, wherein each of the column headings is matched by one of the references included in said attributes;

forming a tree structure from said map file for mapping said text from said flat file into a defined format in said markup language file, and wherein each tag represents one or more nodes of said tree;

reading the map file and using the map file to map text from the legacy file into the defined format in said markup language file, including the step of traversing said legacy file, column by column, and for each of the columns, mapping all of the text in the column to said markup language file, including the steps of:

traversing said nodes of said tree structure, node-by-node, and when one of the references in the attributes of one of the nodes matches the heading of one of the columns of the legacy file, retrieving all of the text from said one of the columns of the legacy file, and entering said retrieved all text into said markup language file; and traversing all of said nodes of said tree to ensure that references are found matching all of the column headings of the legacy file, and thereby to ensure that all of the text from the legacy file is retrieved therefrom and entered into the markup language file.

2. A method according to claim 1, wherein the providing step includes the step of providing the map file with default text for certain elements and attributes in the markup language file.

3. A method according to claim 2, further comprising the step of entering the default text into the markup language for attributes having references that do not match headings of the flat file.

4. A method according to claim 1, wherein the flat file is a tab delimited flat file.

5. A method according to claim 1, wherein the step of providing the map file includes the steps of:

a user creating said map file for converting text of a specified legacy tile to the markup language file;

said specified legacy file having a plurality of specified column headings; and said user providing said map file with references matching all of the specified column headings of the specified legacy file.

6. A method according to claim 5, wherein the step of the user creating said map file includes the step of the user specifying in said map file which elements of the legacy file are to have multiple occurrences in said markup language file, and which elements of the legacy file are to be nested in the markup language file.

7. A method according to claim 6, wherein the step of the user providing said map file with references includes the step of the user providing said map file with the specified column headings of the specified legacy file.

8. A system for converting text in a delimited flat legacy file to text in a markup language specified by a document type definition file, said system comprising:

means for providing a delimited flat legacy file having a plurality of columns with text, each of said columns having a column heading;

means for providing a map file conforming to said document type definition file and having tags and attributes including references matching said headings, wherein each of the column headings is matched by one of the references included in said attributes;

means for forming a tree structure from said map file for mapping said text from said flat file into a defined format in said markup language file, and wherein each tag represents one or more nodes of said tree;

means for reading the map file and using the map file to map text from the legacy file into the defined format in said markup language file, including the step of traversing said legacy file, column by column, and for each of the columns, mapping all of the text in the column to said markup language file, including:

means for traversing said nodes of said tree structure, node-by-node, and when one of the references in the attributes of one of the nodes matches the heading of one of the columns of the legacy file, retrieving all of the text from said one of the columns of the legacy file, and entering said retrieved all text into said markup language file; and means traversing all of said nodes of said tree to ensure that references are found matching all of the column headings of the legacy file, and thereby to ensure that all of the text from the legacy file is retrieved therefrom and entered into the markup language file.

9. A system according to claim 8, wherein the map file includes default text for certain elements and attributes in the markup language file.

10. A system according to claim 9, wherein the traversing means includes means for entering the default text into the markup language for attributes having references that do not match headings of the flat file.

11. A system according to claim 8, wherein the flat file is a tab delimited flat file.

12. A program storage device readable by machine, tangibly embodying a program of instructions executable by the machine to perform method steps for converting text in a delimited flat legacy file to text in a markup language specified by a document type definition file, said method steps comprising:

providing a delimited flat legacy file having a plurality of columns with text, each of said columns having a column heading;

providing a map file conforming to said document type definition file and having tags and attributes including references matching said headings, wherein each of the column headings is matched by one of the references included in said attributes;

forming a tree structure from said map file for mapping said text from said flat file into a defined format in said markup language file, and wherein each tag represents one or more nodes of said tree;

traversing said nodes of said tree structure, node-by-node, and when one of the references in the attributes of one of the nodes matches the heading of one of the columns of the legacy file, retrieving all of the text from said one of the columns of the legacy file, and entering said retrieved all text into said markup language file; and traversing all of said nodes of said tree to ensure that references are found matching all of the column headings of the legacy file, and thereby to ensure that all of the text from the legacy file is retrieved therefrom and entered into the markup language file.

13. A program storage device according to claim 12, wherein the providing step includes the step of providing the map file, with default text for certain elements and attributes in the markup language file.

14. A program storage device according to claim 13, further comprising the step of entering the default text into the markup language for attributes having references that do not match headings of the flat file.

15. A program storage device according to claim 12, wherein the flat file is a tab delimited flat file.

* * * * *